Runyon & Ingersoll,
Coulter.

No. 93,558. Patented Aug. 10. 1869.

Witnesses

Inventors.
John Runyon
George Ingersoll

UNITED STATES PATENT OFFICE.

JOHN RUNYON, OF MARSHALL TOWNSHIP, AND GEORGE INGERSOLL, OF MARSHALL, MICHIGAN.

IMPROVEMENT IN PLOWS.

Specification forming part of Letters Patent No. 93,558, dated August 10, 1869.

*To all whom it may concern:*

Be it known that we, JOHN RUNYON, of the township of Marshall, and GEORGE INGERSOLL, of the city of Marshall, both in the county of Calhoun and State of Michigan, have invented a new and useful Improvement in Plows; and we do hereby declare that the following is a full, clear, and exact description of the construction and operation of the same, reference being had to the annexed drawings, making a part of this specification, in which—

Figure 1:
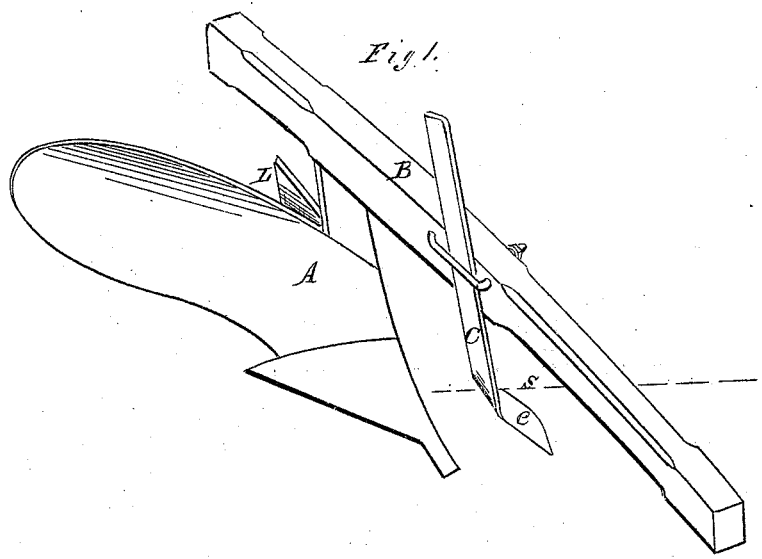
Figure 2:
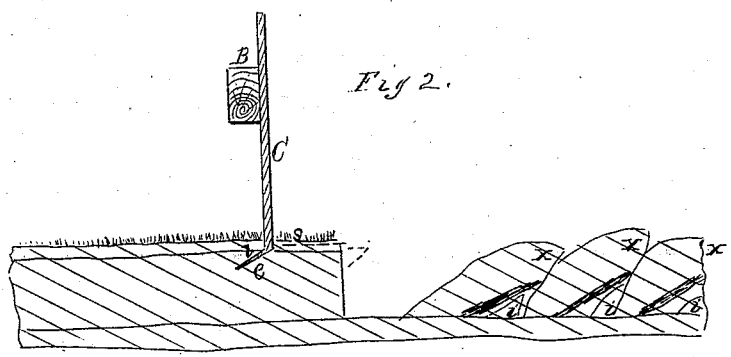

Figure 1 is a perspective view. Fig. 2 is a section, at a right angle with the furrow.

The object of our invention is to more effectually plow under the surface-growth, whether in grass-sod, clover, stubble, or any kind of rank herbage, so that it may not impede future cultivation, either by premature growth or being dragged again to the surface; and it consists in so hanging a plow-colter, and so bending or shaping its cutting end, that it will cut the sod at an obtuse angle with the vertical or bar portion by which the said colter is clamped or otherwise fastened to the beam of the plow; and the better to enable others skilled in the manufacture or use of this important implement of agriculture to construct and use our invention, we will now proceed more minutely to describe the same.

Our improved colter can be applied to any kind of plow in place of the common straight colter, cutting the sod or sward vertically, with this difference, that the construction and operation of our colter require it to be adjustably secured to the right or furrow side of the plow-beam instead of to the left or land side, in the common way, as will be clearly seen and understood by a reference to Fig. 1, where A represents the mold-board and share, B the beam, and L the land-side, of an ordinary plow.

Our improved colter is exhibited, at C, as clamped to the right side of the beam, as hereinbefore described.

We usually construct it of a flat iron bar with straight or curved edges, as may be deemed proper, with the lower end of steel or steel faced, and drawn out thin to a cutting-edge, substantially in the manner of an ordinary colter, but with this difference, that, instead of the cutting-edge being in a line coincident with the said bar, connected adjustably to the plow-beam, it is bent laterally toward the land-side at an angle more or less acute with its horizontal surface, substantially as shown at *e*.

When the colter C is properly adjusted and secured to the beam the angle of the cutting deflection will be at the ground-surface, as represented by the line *s*.

It is well known that with a vertical cut of the colter, when unaccompanied with the use of a small supplementary plow, termed a "jointer," to turn an additional furrow, it is impossible for any plow to completely invert the surface-growth, for the left angle, on being turned, will overlap and lie on the slope formed by the preceding furrow-slice, and expose a line of vegetation in the most favorable condition for active and immediate growth.

It is the design of our invention to slice away and separate this corner vegetation from the ground to be turned over by the plow, so that, when turned, there will be no line of vegetation to grow for some time, at least, as shown by the line *x* in Fig. 2 in the section.

A reference to Fig. 2 will make clear the operation of our angular cutting-point *e* of the colter.

As it separates the corner marked *i*, in advance of the plow, from the land to be plowed, the corner still adheres by the interwoven roots to the unplowed side. This projecting corner, as the plow moves along, is partially cut or rubbed off by the standard D of the plow, and what may be left is turned under at the next plowing.

We had contemplated special arrangements for cutting the left corner clean away by the standard or some cutting attachment, and have had under consideration the propriety of fixing a guard (not shown) in front of the standard, so as to lift and force back the angular strip *i* out of the standard's way, and so bury it intact in the next furrow; but have concluded that, inasmuch as the denuded strip does not impede or impair the proper action of the plow, and that, however detached, it must fall into the deepest part of the furrow, it matters not, practically, which mode is adopted.

The length of the cutting-blade *e* is to be mainly determined by the rankness of the crop to be plowed under; but for general sod we usually make it from three to four inches long, and the angle of depression in the ground is governed by the extent of root-separation that may be deemed necessary. We usually give a good forward slope to the cutting-edge, as shown, so that the cutter may act wedge-like; and in saying that the colter-bar must be fastened to the right or furrow side of the beam we only mean that for a straight colter-bar it is most convenient, as it brings the bent cutting part $e$ in about the right position for action; but it will be readily seen that by properly bending the bar to conform, it may be fastened in the middle of the beam or in its usual place at the left.

Our improved colter costs but little more than the common straight one, and the use of it enables the thorough farmer to dispense with the use of his jointer, which is very difficult of proper adjustment and cumbers the plow.

What we claim as our invention, and desire to secure by Letters Patent, is as follows:

We claim, in combination with a plow, the colter C, having its cutting end $e$ bent to land at a suitable angle and arranged relatively with the plow, substantially in the manner and for the purpose set forth.

JOHN RUNYON.
GEORGE INGERSOLL.

Witnesses:
G. S. WRIGHT,
CHAS. P. BROWN.